United States Patent
Torab Jahromi

(10) Patent No.: US 10,638,408 B2
(45) Date of Patent: Apr. 28, 2020

(54) SPECIFYING SERVICE COMBINATIONS IN PRE-ASSOCIATION DISCOVERY

(71) Applicant: Broadcom Corporation, Irvine, CA (US)

(72) Inventor: Payam Torab Jahromi, Laguna Niguel, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 425 days.

(21) Appl. No.: 15/213,284

(22) Filed: Jul. 18, 2016

(65) Prior Publication Data

US 2017/0019840 A1 Jan. 19, 2017

Related U.S. Application Data

(60) Provisional application No. 62/193,566, filed on Jul. 16, 2015.

(51) Int. Cl.
*H04W 48/16* (2009.01)
*H04L 29/08* (2006.01)

(52) U.S. Cl.
CPC ............ *H04W 48/16* (2013.01); *H04L 67/16* (2013.01)

(58) Field of Classification Search
CPC .............. H04L 67/16; H04L 29/08648; H04L 29/08423; H04L 61/301; H04L 67/1068; H04L 67/1061; H04L 4/00; H04W 12/06; H04W 48/16; H04W 8/005
See application file for complete search history.

(56) References Cited

U.S. PATENT DOCUMENTS

| | | | | |
|---|---|---|---|---|
| 2009/0279472 | A1* | 11/2009 | Kyung | H04W 72/005 370/312 |
| 2012/0066767 | A1* | 3/2012 | Vimpari | H04L 9/0866 726/26 |
| 2014/0126563 | A1* | 5/2014 | Chen | H04W 48/14 370/338 |
| 2014/0293978 | A1* | 10/2014 | Yang | H04W 8/005 370/338 |
| 2015/0106499 | A1* | 4/2015 | Venkata Naga Ravi | G06Q 30/02 709/224 |
| 2015/0117442 | A1* | 4/2015 | Cicchino | H04L 65/1069 370/352 |

\* cited by examiner

*Primary Examiner* — Frantz Bataille
(74) *Attorney, Agent, or Firm* — Morgan, Lewis & Bockius LLP

(57) ABSTRACT

A device for specifying service combinations in pre-association discovery includes at least one processor. The at least one processor may be configured to determine at least one combination of services of interest. The at least one processor may be further configured to encode the at least one combination of the services of interest. The at least one processor may be further configured to generate a pre-association request message that includes identifiers of the services of interest and the encoded at least one combination of the services of interest. The at least one processor may be further configured to transmit the pre-association request message. The encoded at least one combination of the services of interest may be represented, for example, in a canonical sum-of-products form, a canonical product-of-sums form, a sum-of-positive-products form, or an any m of n form.

20 Claims, 8 Drawing Sheets

510

- Combination function
  - $C(x_1, x_2, x_3, x_4, x_5) = x_1 x_2 x_4 + x_2 x_3 x_4 + x_1 x_3 x_4 + x_1 x_2 x_5 + x_2 x_3 x_5 + x_1 x_3 x_5 + x_4 x_5$
- Sum-of-products representation
  - $2^5 = 32$ bits (4 octets)
- Two-stage $m$-of-$n$ (in this case $m$-of-5) representation
  - $C(x_1, x_2, x_3, x_4, x_5) = (x_1 x_2 + x_2 x_3 + x_1 x_3) x_4 + (x_1 x_2 + x_2 x_3 + x_1 x_3) x_5 + x_4 x_5$
  - $= (x_1, x_2, x_3)_2 \, x_4 + (x_1, x_2, x_3)_2 \, x_5 + x_4 x_5$
  - $= ((x_1, x_2, x_3)_2, x_4, x_5)_2$
  - $(x_1, x_2, \ldots, x_n)_m$ denotes $m$-of-$n$ function
  - Example encoding
    - $((5+3) + (5+3) + (5+3)) + 5 = 29$ bits

SOPP form savings in octets

| Number of Services N | Sum-of-products form ($\lceil 2^N/8 \rceil$ octets) | Sum-of-positive-products form ($\lceil N(N-1)/8 \rceil$ octets) | Saving in number of octets |
|---|---|---|---|
| 1 | 0 | 0 | 0% |
| 2 | 1 | 1 | 0% |
| 3 | 1 | 1 | 0% |
| 4 | 2 | 2 | 0% |
| 5 | 4 | 3 | 25% |
| 6 | 8 | 3 | 62.5% |
| 7 | 16 | 6 | 62.5% |
| 8 | 32 | 7 | 78.125% |

SPECIFYING SERVICE COMBINATIONS IN PRE-ASSOCIATION DISCOVERY

CROSS-REFERENCE TO RELATED APPLICATIONS

The present application claims the benefit of U.S. Provisional Patent Application Ser. No. 62/193,566, entitled "Combining Service Hashes in Service Discovery," filed on Jul. 16, 2015, which is hereby incorporated by reference in its entirety for all purposes.

TECHNICAL FIELD

The present description relates generally to pre-association discovery, including specifying service combinations in pre-association discovery messages.

BACKGROUND

A device seeking to access a combination of services provided by another device in a network environment, such as a wireless network environment, may engage in a pre-association discovery procedure to identify a device in the network that can provide the combination of the services of interest. The pre-association discovery procedure may utilize messages, e.g. probe request/response messages, beacon messages, etc., that are transmitted using a robust modulation and coding scheme with a low data rate to provide the highest level of protection for the messages. The device may transmit a request message that indicates the services of interest, and devices in the network may transmit a response message if they can provide any of the individual services of interest. Thus, the device seeking to access the combination of services may need to transmit/receive multiple low data rate pre-association discovery messages with each responding device in order to identify a devices that can provide the desired combination of services, which may occupy a significant amount of bandwidth in the network environment while also resulting in latency before the combination of services can be accessed.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates an example encoding for specifying service combinations in pre-association discovery in accordance with one or more implementations.

FIG. 7 illustrates an example table listing sum-of-positive-products form savings in octets when specifying service combinations in pre-association discovery in accordance with one or more implementations.

DETAILED DESCRIPTION

Figure 1:
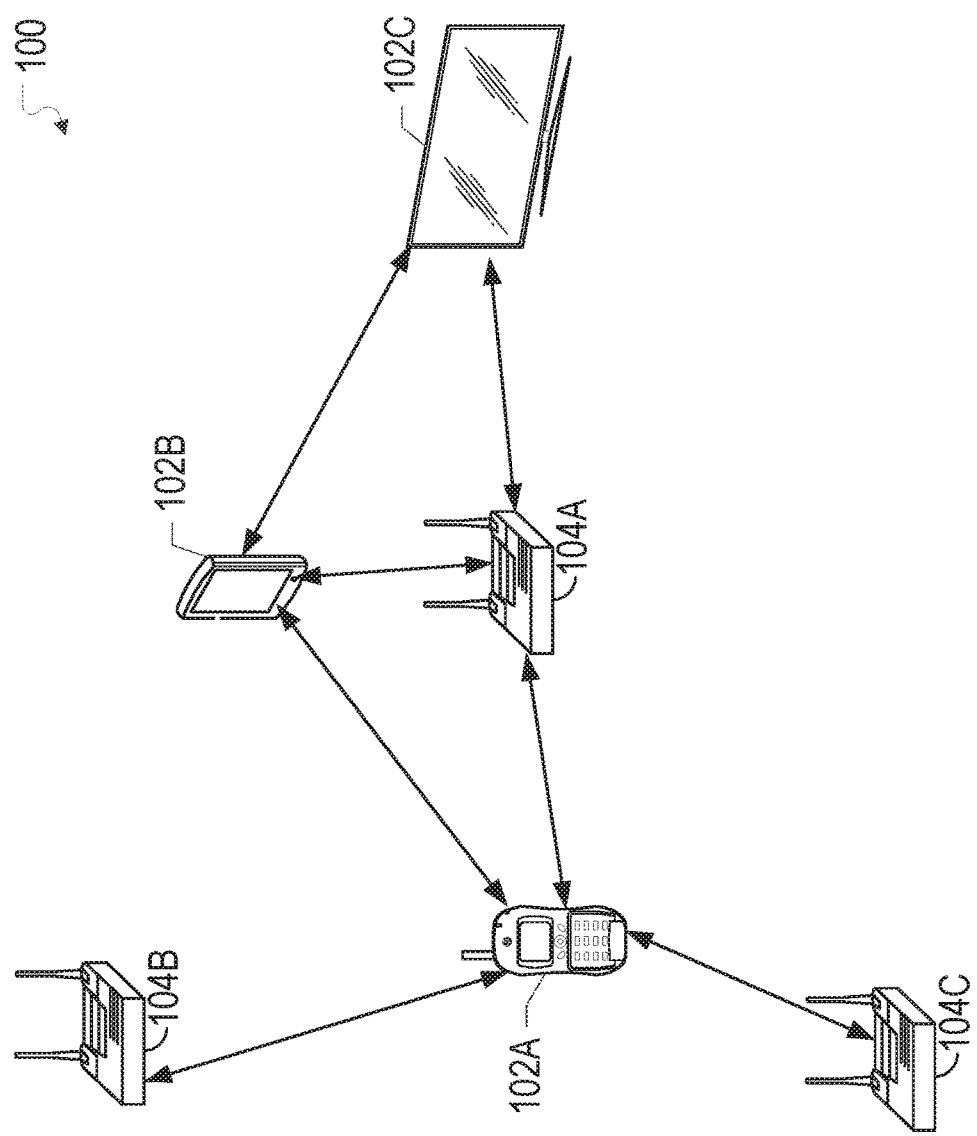
FIG. 1 illustrates an example network environment in which a system for specifying service combinations in pre-association discovery may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, a device seeking to access a combination of services provided by another device in a network environment, such as a wireless network environment, may transmit a request message, such as a probe request message (or frame), that specifies the services of interest and that also specifies one or more requested combinations of the services of interest. Other devices in the network that receive the request message determine whether they can provide any of the requested combinations of the services of interest. The other devices in the network may only respond to the message, e.g. with a probe response message (or frame), when they can provide any of the requested combinations of the services of interest, rather than responding when they can provide any of the individual services of interest. In this manner, a device seeking to access the combination of services may only need to transmit one pre-association request message, and receive one pre-association response message, in order to identify a device that can provide the requested combination of services, thereby reducing the bandwidth utilized by pre-association discovery messages in the network environment while also reducing the latency incurred before the requested combination of the services of interest can be accessed by the device.

In order to reduce the amount of bandwidth utilized by the individual pre-association messages, the subject system may utilize one or more encoding schemes to encode (or compress) a representation of the requested combinations of the services of interest. The encoded representation of the requested combinations of the services of interest may utilize, for example, one or more of a canonical sum-of-products form, a canonical product-of-sums form, a sum-of-positive-products form, and/or an any m of n form. In this manner, the encoding can represent any Boolean functions with respect to any combinations of the services of interest. The subject system may be similarly applied to devices in the network that transmit messages advertising the various combinations of services that they provide. The subject system may be generally applicable to probe request/response messages, beacon messages, or any service discovery (generic advertisement service) frames.

FIG. 1 illustrates an example network environment 100 in which a system for specifying service combinations in pre-association discovery may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more network devices 102A-C and one or more network access devices 104A-C. For explanatory purposes, the network access devices 104A-C are illustrated as access points. However, the network access devices 104A-C may also be and/or include, for example, a router device, a switch device, a base station device, one or more of the network devices 102A-C, or generally any network device. In one or more implementations, one or more of the network access devices 104A-C may be a personal basic service set (PBSS) coordination point (PCP) where only the one or more network access devices 104A-C transmit beacon frames. Alternatively, or in addition, one or more of the network devices 102A-C may also transmit beacon frames in the example network environment 100. The one or more of the network access devices 104A-C, and/or one or more of the network devices 102A-C, may be coupled to a network, such as the Internet, via wireless or wired transmission media, such as a fiber optic transmission media.

The network devices 102A-C may communicate with one or more of the network access devices 104A-C, and/or each other, using one or more wireless communication technologies, such as Wi-Fi (e.g. 802.11ac, 802.11ax, etc.), cellular (e.g. 3G, 4G, 5G, etc.), directional multi-gigabit (DMG), and/or mmWave (e.g. 802.11ad, 802.11ay, etc.). The network devices 102A-C may communicate with the one or more network access devices 104A-C, and/or each other, using single carrier transmissions and/or multi-carrier transmissions, such as orthogonal frequency-division multiplexing transmissions.

In one or more implementations, one or more of the network devices 102A-C may communicate with the network access devices 104A-C, and/or each other, over a wired transmission medium, such as a powerline transmission medium, a coaxial transmission medium, an optical transmission, an Ethernet transmission medium, and the like. One or more of the network devices 102A-C may also communicate directly with one another using peer-to-peer transmissions, e.g. bypassing the network access devices 104A-C, and/or independent of coordination from the network access devices 104A-C. For explanatory purposes, multiple different wireless and wired technologies are described herein. However, the subject system is PHY-independent and can be uniformly implemented across generally any communication technology.

In the network environment 100, the network access devices 104A-C may each provide one or more services. The services may include, for example, access to a particular carrier network, such as AT&T, Verizon, etc., Wi-Fi offloading, 3G access, 4G access, and/or any billing rates associated therewith, etc. For example, the network access device 104A may provide access to an AT&T cellular network with Wi-Fi offloading and 3G access at a first billing rate (e.g. cost per megabyte), the network access device 104B may provide access to the AT&T cellular network with 4G access (but without Wi-Fi offloading) at a second billing rate, and the network access device 104C may provide access to the Verizon cellular network with 4G access at a third billing rate. In addition, one or more of the network devices 102A-C may each provide one or more services, such as various types of print/copy/fax services, e.g. color, duplex, etc., user input device services, such as mouse and/or keyboard access, docking station services, screencasting services, etc.

One of the network devices 102A-C in the network environment 100, such as the network device 102A, may be interested in accessing one or more combinations of services provided by one of the other devices 102B-C, 104A-C in the network environment 100. For example, the network device 102A may be interested in accessing a particular carrier network with Wi-Fi offloading and 3G access at a billing rate, or accessing a particular carrier network with 4G access at a different billing rate.

In the subject system, instead of individually authenticating and associating with each of the other devices 102B-C, 104A-C in the network environment 100 in order to determine whether they can provide either of the requested combinations of the services of interest, the network device 102A transmits a pre-association request message, such as a probe request message, that indicates the combinations of the services of interest that are being requested. For example, the network device 102A may utilize one or more of the data structure formats discussed below with respect to FIG. 4 to transmit the combinations of the services of interest that are being requested and/or the network device 102A may utilize one or more of the encoding schemes discussed further below with respect to FIGS. 4 and 5 to reduce the size of the pre-association request message.

If one or more of the other devices 102B-C, 104A-C, such as the network access devices 104A-B, can provide any of the requested combinations of the services of interest, the network access devices 104A-B may each transmit a pre-association response message, such as a probe response message, that indicates that the network access devices 104A-B can provide one or more of the requested combinations of the services. The network device 102A may then select one of the network access devices 104A-B to authenticate and associate with to access the requested combination of the services of interest. An example process of the network device 102A transmitting a pre-association request message that indicates one or more requested combinations of services of interest is discussed further below with respect to FIG. 2, and an example process of the network access devices 104A-B transmitting a pre-association response message is discussed further below with respect to FIG. 3.

Figure 2:
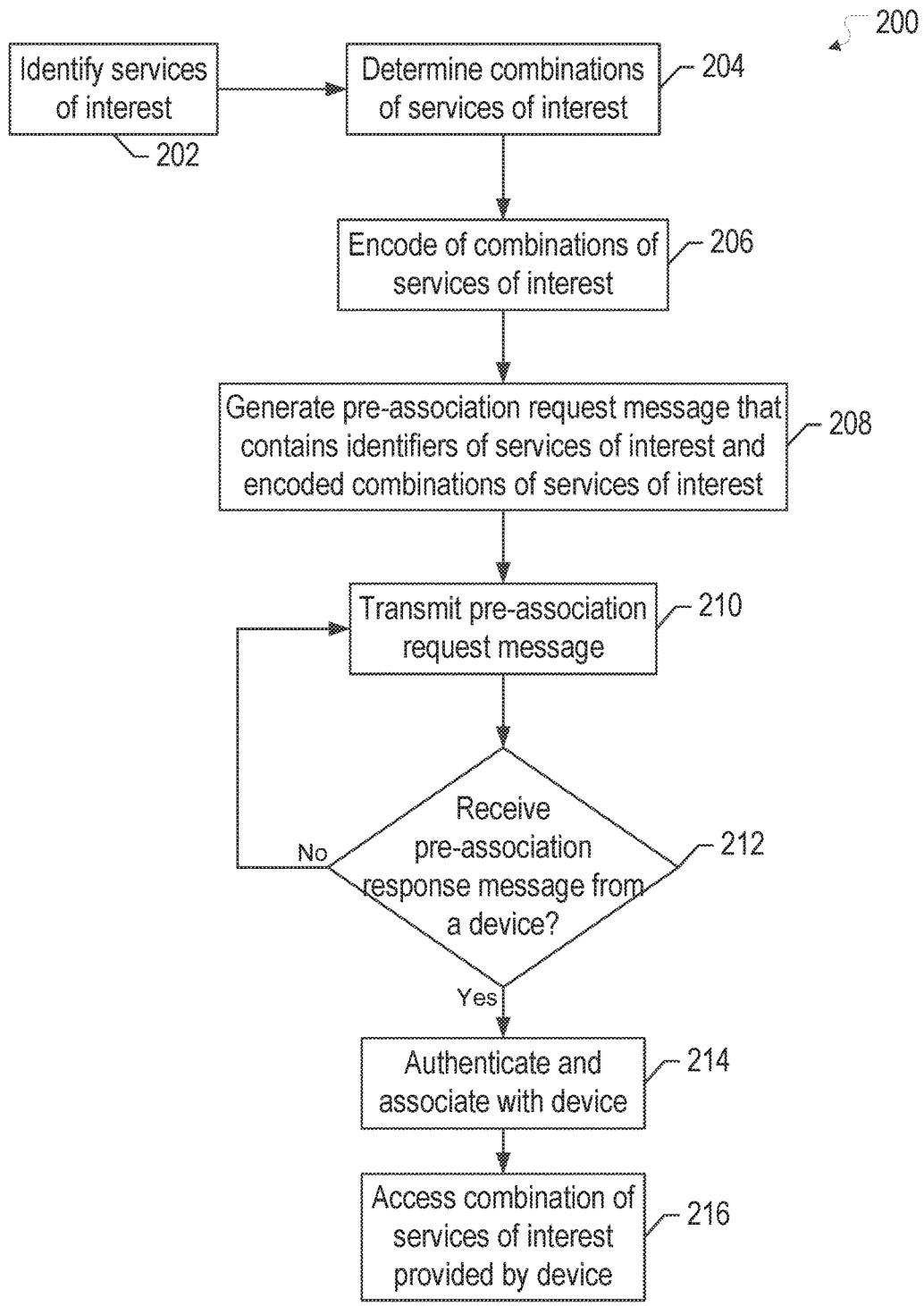
FIG. 2 illustrates a flow diagram of an example process of a requesting network device implementing a system for specifying service combinations in pre-association discovery in accordance with one or more implementations.

FIG. 2 illustrates a flow diagram of an example process 200 of a requesting network device 102A implementing a system for specifying service combinations in pre-association discovery in accordance with one or more implementations. For explanatory purposes, the example process 200 is described herein primarily with reference to the network device 102A and the network access device 104A of FIG. 1; however, the example process 200 is not limited to the network device 102A or the network access device 104A of FIG. 1. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

The network device 102A identifies one or more services of interest that it would like to access (202). For example, a user of the network device 102A may indicate an interest in accessing one or more particular carrier networks, e.g. AT&T, Verizon, etc., with Wi-Fi offloading, 3G access, and/or 4G access. The network device 102A may then determine the combinations of the services of interest that the network device 102A would like to access (204). For example, a user of the network device 102A may indicate an interest in accessing a first carrier network with Wi-Fi offloading and 3G access at a first billing rate, accessing a second carrier network with 4G access at a second billing rate, or accessing a third carrier network with 3G or 4G access at a third billing rate.

The network device 102A then encodes the combinations of the services of interest into a form that can be conveyed in the pre-association response message, such as by using one or more flag data fields and/or a bitmap (206). Example encodings of the combinations of the services of interest are discussed further below with respect to FIGS. 4 and 5. The network device 102A then generates the pre-association request message that contains identifiers of the services of interest, as well as the encoded requested combinations of the services of interest (208). An identifier of a service of interest may be, for example, a hash of a name associated with the service of interest, such as the first 6 octets of the SHA-256 hash of the name associated with the service of interest.

The network device 102A then transmits the pre-association request message (210). The network device 102A may transmit the pre-association request message before associating with any of the other devices 102B-C, 104A-C in the network environment 100. If the network device 102A does not receive a response from any of the other devices 102B-C, 104A-C in the network environment 100 within a pre-determined amount of time (212), the network device 102A retransmits the pre-association request message (210).

If the network device 102A receives a pre-association response message from one or more of the other devices 102B-C, 104A-C in the network environment 100, such as the network access device 104A, that indicates that the network access device 104A can provide one of the requested combinations of the services of interest, the network device 102A authenticates and associates with the network access device 104A (214). If the network device 102A receives multiple pre-association response messages, such as from the network access devices 104A-C, the network device 102A may select one of the network access devices 104A-C to authenticate and associate with. In one or more implementations, the network device 102A may choose not to authenticate or associate with the network access device 104A when the network access device 104A is able to provide one of the requested combinations of the services of interest.

The authentication process may include having the network device 102A establish its identity with the network access device 104A. For example, the network device 102A may establish its identity through open system authentication and/or shared key authentication. After successfully authenticating with the network access device 104A, the network device 102A may associate (e.g. register) with the network access device 104A to gain full access to the services provided by the network access device 104A. The association allows the network access device 104A to properly deliver data to the network device 102A. When the network access device 104A grants association to the network device 102A, it responds with an Association ID (AID) assigned to the network device 102A. After associating with the network access device 104A, the network device 102A can access the combination of the services of interest provided by the network access device 104A (216).

In one or more implementations, the network device 102A may be unable to include all of the encoded combinations of the services of interest into a signal pre-association request message (208). In this instance, the network device 102A may need to transmit/receive multiple pre-association request/response messages (210, 212) with one or more devices in the network environment 100 to identify a device that can provide a requested combination of the services of interest. For example, the network device 102A may conduct the search for the combinations of services of interest in multiple phases.

Figure 3:
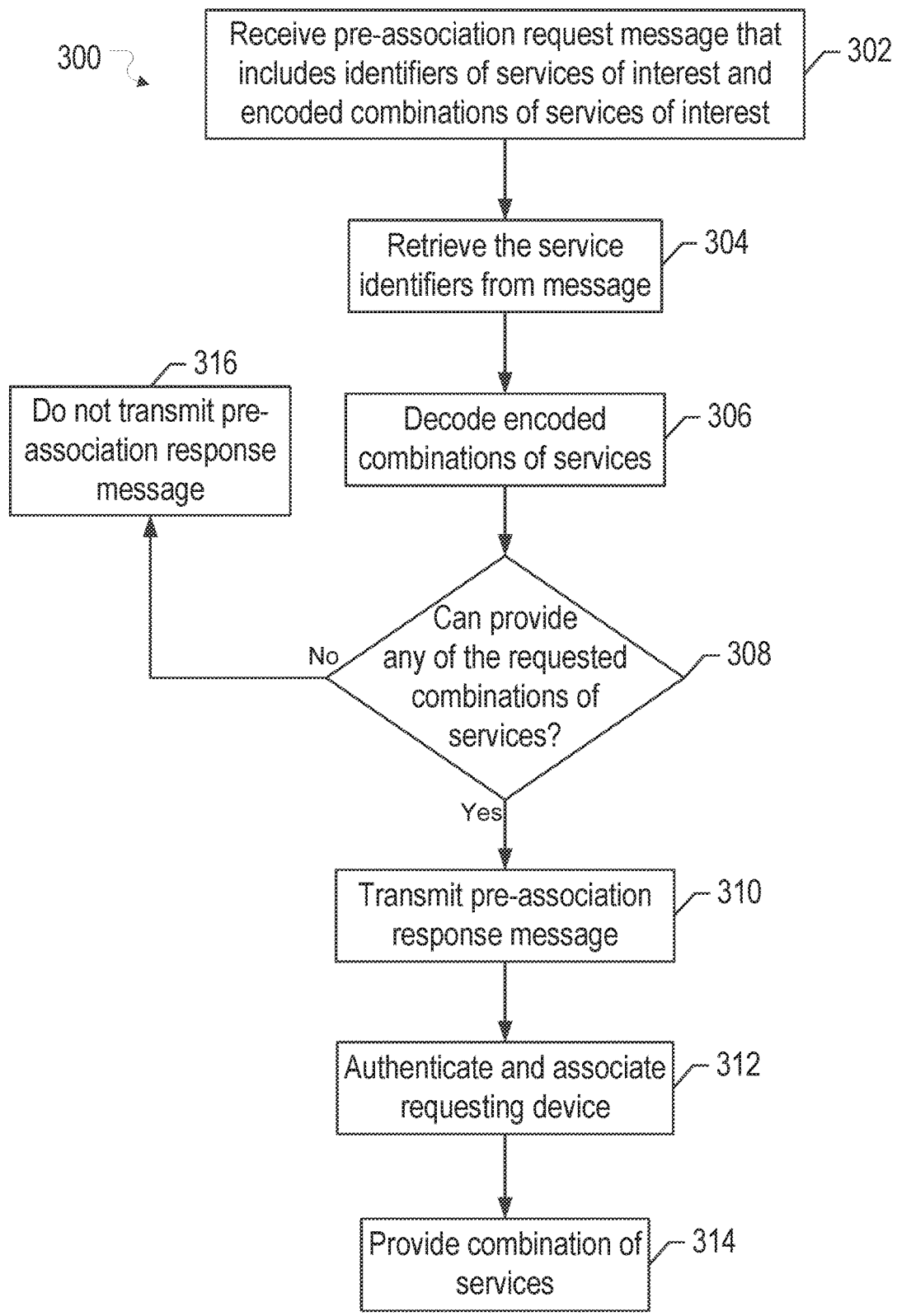
FIG. 3 illustrates a flow diagram of an example process of a responding network access device implementing a system for specifying service combinations in pre-association discovery in accordance with one or more implementations.

FIG. 3 illustrates a flow diagram of an example process 300 of a responding network access device 104A implementing a system for specifying service combinations in pre-association discovery in accordance with one or more implementations. For explanatory purposes, the example process 300 is described herein primarily with reference to the network access device 104A and the network device 102A of FIG. 1; however, the example process 300 is not limited to the network access device 104A or the network device 102A of FIG. 1. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The network access device 104A receives a pre-association request message that includes identifiers of services of interest, such as the hashes of the names associated with the services of interest, as well as an encoded combinations of the services of interest (302). The network access device 104A may retrieve the service identifiers from the message (304) and decode the encoded combinations of services (306). Decoding the encoded combinations of the services of interest is discussed further below with respect to FIGS. 4 and 5.

The network access device 104A determines whether it can provide any of the requested combinations of services indicated in the message (308). If the network access device 104A cannot provide any of the requested combinations of services indicated in the message (308), the network access device 104A does not transmit a pre-association response message (316). If the network access device 104A can provide one or more of the requested combinations of the services of interest (308), the network access device 104A transmits a pre-association response message (310). The pre-association response message may indicate that the network access device 104A can provide one or more of the requested combinations of the services of interest, and/or the message may specify the one or more requested combinations of the services of interest that the network access device 104A can provide. For example, the network access device 104A may transmit a probe response frame whose service information response access network query protocol (ANQP) element contains a basic service information descriptor field for a combination of services that satisfy the request.

The network access device 104A then receives a request to authenticate and associate from the network device 102A, and the network access device 104A authenticates and associates with the network device 102A (312). In one or more implementations, the network device 102A may not wish to authenticate and associate with the network access device 104A even when the network access device 104A can provide one of the requested combinations of the services of interest. For example, the network device 102A may wish to access a requested combination of services provided by another network access device 102B. In this instance, the network access device 104A does not receive the request to authenticate and associate from the network device 102A. After authenticating and associating with the network device 102A, the network access device 104A provides the network device 102A with access to the requested combination of the services of interest (314).

In one or more implementations, the network access device 104A may transmit advertisement messages, such as beacon messages, that may indicate the combinations of services that the network access device 104A can provide, e.g. rather than only indicating that it can provide all of the included services. The network access device 104A may encode the combinations of the services in the manner discussed below with respect to FIGS. 4 and 5 and include the encoded combinations of the services in the advertisement message. The network device 102A may receive the advertisement message, decode the combinations of the services that the network access device 104A can provide, and determine whether to request authentication and association with the network access device 104A based on the combinations of the services that the network access device 104A can provide.

Figure 4:
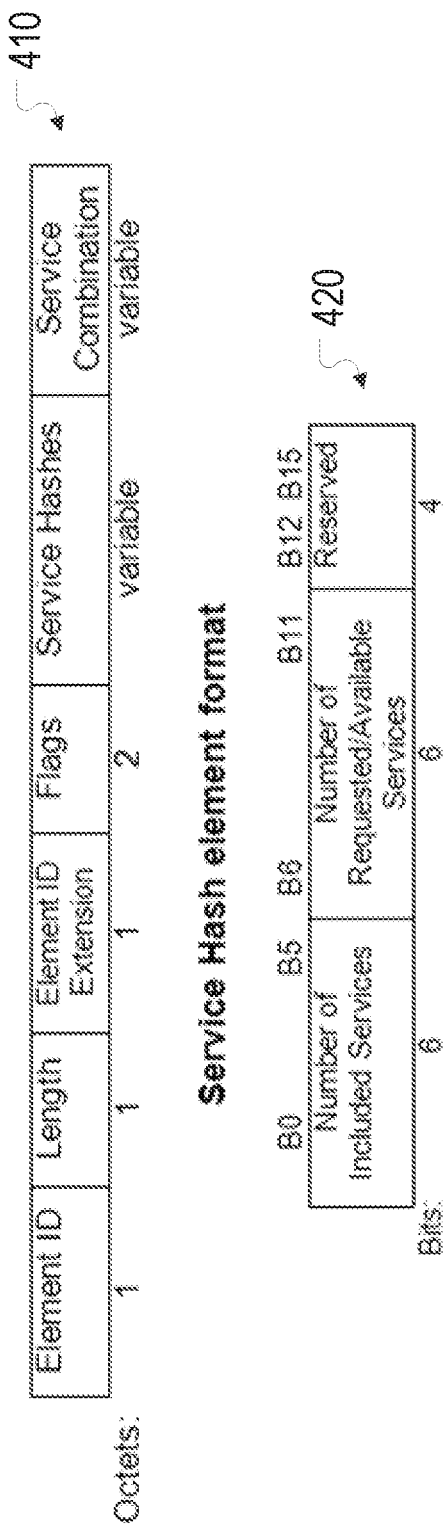
FIG. 4 illustrates example data structure formats for specifying service combinations in pre-association discovery in accordance with one or more implementations.

FIG. 4 illustrates example data structure formats 410, 420 for specifying service combinations in pre-association discovery in accordance with one or more implementations. The service hash element format 410 includes a one octet element identifier field, a one octet length field, a one octet element identifier extension field, a two octet flags field, a variable length service hashes field, and a variable length service combination field. The flags field format 420 includes a six bit number of included services field, a six bit number of requested/available services field, and a four bit reserved field. The example data structure formats 410, 420 may be utilized by one or more of the network devices 102A-C to specify requested combinations of services, and/or by one or more of the network access devices 104A-C to advertise available combinations of services.

The number of included services field indicates the number of service hashes that are included in the element and is set to a nonzero value. A value of r for the number of requested/available services field indicates a search for devices that provide at least r services among those specified by the service hashes included in the element, or providing at most r services out of those specified by the service hashes included in the element. Any value of the number of requested/available services field that is equal to or greater than the value of the number of included services field indicates search for devices that provide all the services included in the element, or providing all services included in the element. The field is set to 0 when searching for devices that provide a combination of services included in the element that cannot be described by an "any r-of-n" format. Searching for devices that provide any (i.e., at least one), or all of the services included in the Service Hash element can be described by "any r-of-n" format. Similarly, the field is set to 0 when providing a combination of services included in the element that cannot be described by an "any r-of-n" format. Providing at most one, or all of the services included in the service hash element can be described by "any r-of-n" format.

The service hashes field contains one or more 6-octet service hash values, such as the first 6-octets of hashes of the names associated with the services. The service combination field may be present only when the number of requested services field is set to 0. If present, denoting the number of service hashes in the element by n, the service combination field carries a service combination bitmap that is $2^n$ bits in length and is organized into $\lceil 2^n/8 \rceil$ octets such that bit number b ($0 \leq b < 2^n$) in the bitmap corresponds to bit number (b mod 8) in octet number $\lfloor b/8 \rfloor$, where the low order bit of each octet is bit number 0, and the high order bit is bit number 7. For example, the service combination bitmap may be the sum-of-products representation of a Boolean function of n Boolean variables $x_1, \ldots, x_n$, where $x_i$ (i=1, ..., n) indicates search for the service corresponding to the i-th service hash included in the element. Specifically, bit b ($0 \leq b < 2^n$) in the bitmap corresponds to minterm $m_b$ in a sum-of-products representation. The sum-of-products form overhead relative to service hash values is discussed further below with respect to FIG. 6.

For example, if the network device 102A would like to search for devices 102B-C, 104A-C in the network environment 100 that can provide service $S_1$ or service $S_2$ or both services $S_3$ and $S_4$, where the services $S_1$, $S_2$, $S_3$ and $S_4$ appear in the service hash element in that order, the service combination of interest can be represented by the Boolean function $x_1+x_2+x_3.x_4$, or the sum of minterms $m_1$, $m_2$, $m_3$, $m_5$, $m_6$, $m_7$, $m_9$, $m_{10}$, $m_{11}$, $m_{12}$, $m_{13}$, $m_{14}$, and $m_{15}$ using the sum-of-product representation. The resulting bitmap is 1111111011101110 binary, and the value of the Service Combination field is 0xFEEE. The network device 102A may then transmit a probe request message that includes the service hash element with these values.

If the network access device 104A receives the probe request message that includes the service hash element with hash values for the four services $S_1$, $S_2$, $S_3$ and $S_4$ (in that order) and a value of 0xFEEE in its service combination field, the network access device 104A responds to the request if and only if it can provide service $S_1$ or service $S_2$ or both services $S_3$ and $S_4$.

For explanatory purposes, the combinations of the services of interest are described above as being encoded using a canonical sum-of-products form. The sum-of-products form can express an arbitrary Boolean function of N Boolean variables as a sum of up to $2^N$ minterms (or product of $2^N$ maxterms with POS form) using $2^N$ bits or $\lceil 2^N/8 \rceil$ octets. However, the combinations of the services of interest may also be encoded using a product-of-sums (POS) form, a sum-of-positive-products (SOPP) form, an any M of N form, or generally any encoding form.

Since the network device 102A may often be specifying services of interest, as opposed to specifying services that are not of interest, the encoding may also utilize a class of Boolean functions known as positive Boolean functions (a Boolean function f of N Boolean variables is positive if it is increasing, i.e., $X \leq Y \Rightarrow f(X) \leq f(Y)$ for any X, Y belonging to $\{0, 1\}^N$, where $\leq$ is interpreted as ordered comparison), which may include the sum-of-positive-products form.

Thus, the Boolean functions of interest for N services $S_1$, $S_2, \ldots, S_N$ can be written as a sum-of-positive-products form:

$$F(S_1, S_2, \ldots, S_N) = S_1 \cdot (\text{product of some of the advertised services other than } S_1) +$$
$$S_2 \cdot (\text{product of some of the advertised services other than } S_2) +$$
$$\ldots$$
$$S_N \cdot (\text{product of some of the advertised services other than } S_N);$$

or by an N×N combination matrix:

$$A = \begin{bmatrix} 1 & a_{12} & \ldots & a_{1N} \\ a_{21} & 1 & \ldots & a_{2N} \\ \vdots & \vdots & \ddots & \vdots \\ a_{N1} & a_{N2} & \ldots & 1 \end{bmatrix}$$

where $a_{ij}=1$ if the term i in the sum above includes $S_j$, i,j=1, 2, ..., N.

For example, the Boolean function $F(S_1, S_2, S_3, S_4) = S_1 S_2 + S_2 S_3 + S_3 S_1 + S_4 S_1 S_2$ can be represented by the 4×4 combination matrix:

$$\begin{bmatrix} 1 & 1 & 0 & 0 \\ 0 & 1 & 1 & 0 \\ 1 & 0 & 1 & 0 \\ 1 & 1 & 0 & 1 \end{bmatrix}$$

Since all diagonal elements of a combination matrix are 1, it suffices to represent the matrix by its N(N−1) off-diagonal elements. Thus, Boolean functions of interest for service discovery can be represented by $\lceil N(N-1)/8 \rceil$ octets instead of $\lceil 2^N/8 \rceil$ octets. In addition, the following two special cases may be signaled independently to save bytes: ANY of the N listed services (OR), combination matrix equal to identity matrix ($I_{N \times N}$), or ALL of the N listed services (AND), all combination matrix elements equal to 1 ($1_{N \times N}$). The sum-of-positive-products form savings in octets is discussed further below with respect to FIG. 7.

With respect to the any M of N form, a combination of $ANY_M$ Boolean functions ($ANY_M(X_1, X_2, \ldots, X_N)$ is 1 if at least M of its N Boolean arguments are equal to 1 and 0 otherwise, e.g., $ANY_1(S_1, S_2) = S_1 + S_2$, $ANY_2(S_1, S_2) = S_1 \cdot S_2$, and $ANY_2(S_1, S_2, S_3) = S_1 S_2 + S_1 S_3 + S_2 S_3$). The any M of N form is discussed further below with respect to FIG. 5.

FIG. 5 illustrates an example encoding for specifying service combinations in pre-association discovery in accordance with one or more implementations. As shown in FIG. 5, a combination function 510 can be represented in a sum-of-products form using 32 bits (4 octets) while the combination function 510 can be represented in a two-stage m-of-n form (in this instance m-of-5 form) using only 29 bits.

Figure 6:
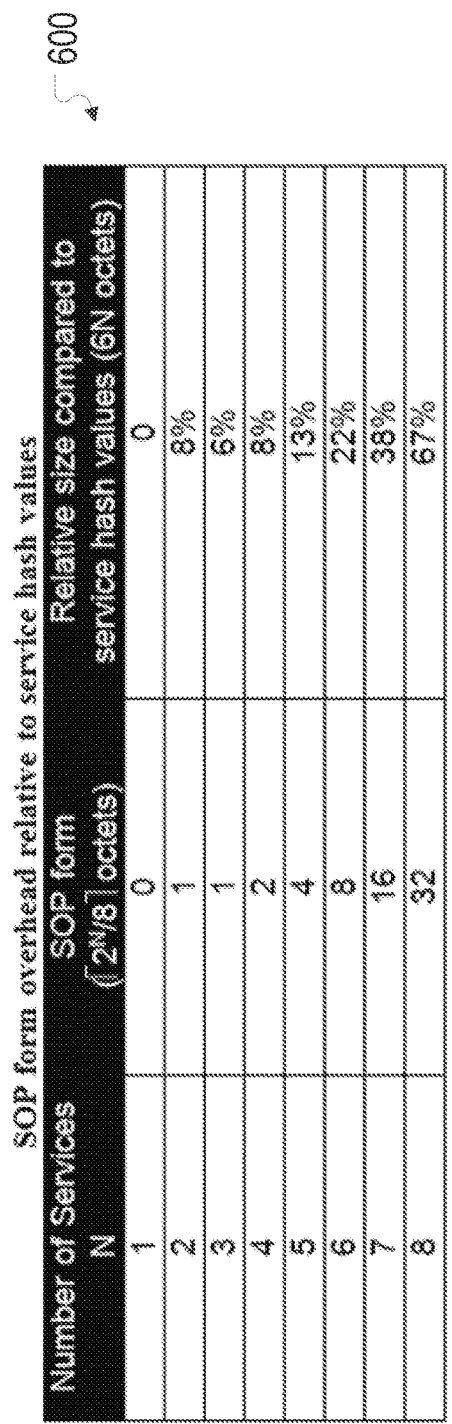
FIG. 6 illustrates an example table listing sum-of-products form encoding overhead relative to service hash values when specifying service combinations in pre-association discovery in accordance with one or more implementations.

FIG. 6 illustrates an example table 600 listing sum-of-products form encoding overhead relative to service hash values when specifying service combinations in pre-association discovery in accordance with one or more implementations.

FIG. 7 illustrates an example table 700 listing sum-of-positive-products form savings in octets when specifying service combinations in pre-association discovery in accordance with one or more implementations.

Figure 8:
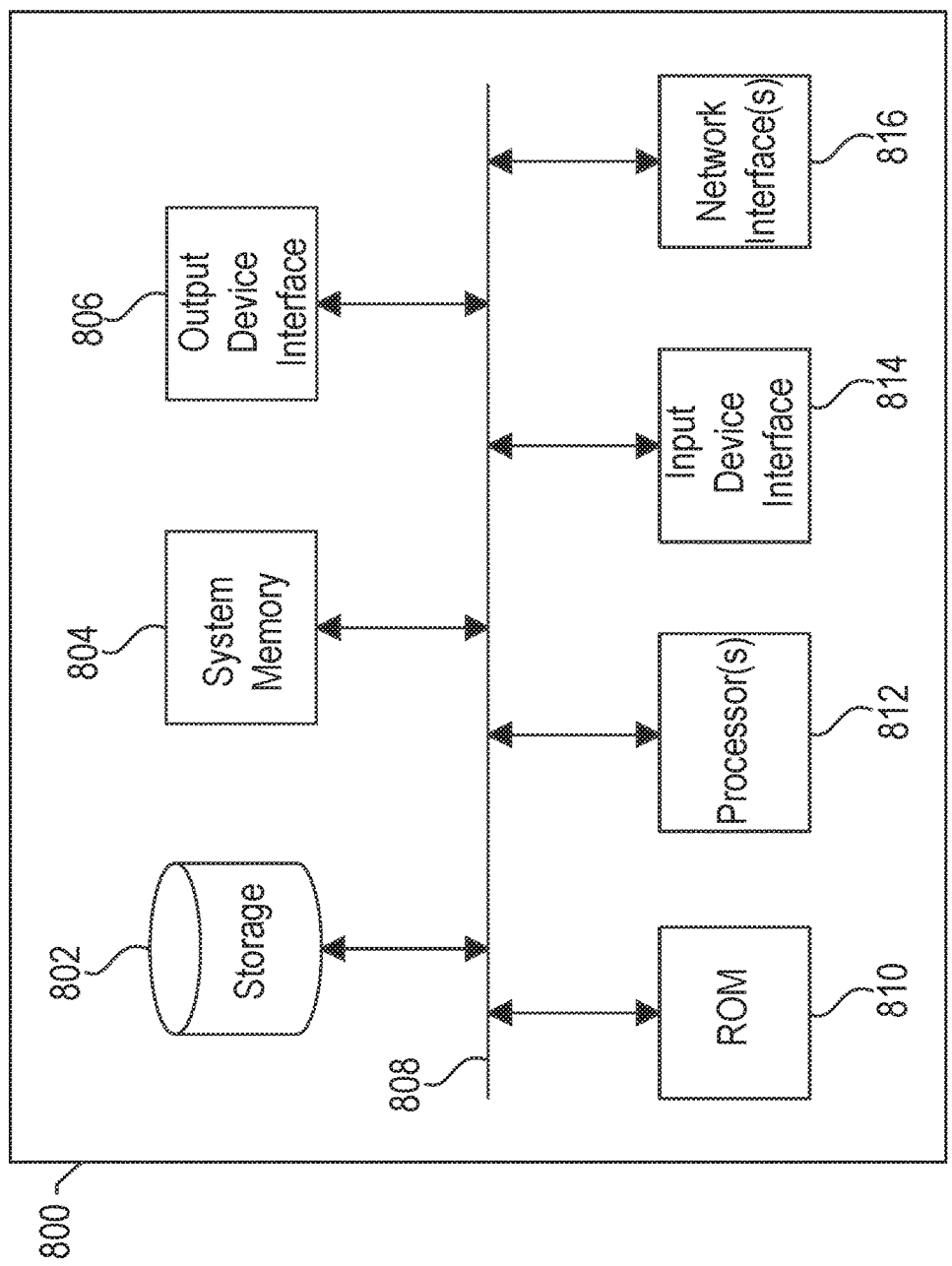
FIG. 8 conceptually illustrates an electronic system with which one or more implementations of the subject technology may be implemented.

FIG. 8 conceptually illustrates an electronic system 800 with which one or more implementations of the subject technology may be implemented. The electronic system 800, for example, may be, or may be coupled to, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 800 can be, and/or can be a part of, one or more of the network devices 102A-C and/or one or more of the network access devices 104A-C. Such an electronic system includes various types of computer readable media and interfaces for various other types of computer readable media. The electronic system 800 includes a bus 808, one or more processor(s) 812, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 retrieve instructions to execute and data to process in order to execute the processes of the subject disclosure. The one or more processor(s) 812 can be a single processor or a multi-core processor in different implementations.

The ROM 810 stores static data and instructions that are needed by the one or more processor(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processor(s) 812 may need at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by the electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, the bus 808 also couples the electronic system 800 to one or more networks (not shown) through one or more network interface(s) 816. One or more network interface(s) may include an Ethernet interface, a Wi-Fi interface, a cellular interface, a mmWave interface, a reduced gigabit media independent interface (RGMII), or generally any interface for connecting to a network. The one or more network interfaces 816 may include, or may be coupled to, a physical layer module. In this manner, the electronic system 800 can be a part of one or more networks of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
      determine at least one combination of services of interest;
      encode the at least one combination of the services of interest;
      generate a pre-association request message that includes identifiers of the services of interest, wherein the pre-association request message further includes the encoded at least one combination of the services of interest separate from the identifiers of the services of interest; and
      transmit the pre-association request message.

2. The device of claim 1, wherein each of the services of interest is associated with a service name and each of the identifiers comprises at least a portion of a hash of the service name of the associated service of interest.

3. The device of claim 1, wherein the at least one combination of the services of interest comprises two different combinations of the services of interest, each of the services of interest is included in at least one of the two different combinations of the services of interest, and at least one of the services of interest is not included in both of the two different combinations of the services of interest.

4. The device of claim 1, wherein the at least one processor is further configured to:
   receive, from another device, a pre-association response message responsive to the pre-association request message, the pre-association response message indicating that the another device provides the at least one combination of the services of interest;
   determine, based at least in part on the pre-association request message, to authenticate and associate with the another device; and
   access, responsive to authenticating and associating with the another device, the at least one combination of the services of interest.

5. The device of claim 4, wherein the pre-association request message comprises a probe request message and the pre-association response message comprises a probe response message.

6. The device of claim 1, wherein the encoded at least one combination of the services of interest is represented in a canonical sum-of-products form.

7. The device of claim 1, wherein the encoded at least one combination of the services of interest is represented in at least one of: a canonical product-of-sums form or a sum-of-positive-products form.

8. The device of claim 1, wherein the encoded at least one combination of the services of interest comprises a total number of the services of interest and a requested minimum number of the services of interest.

9. The device of claim 8, wherein when the minimum requested number of the services of interest is set to zero, the encoded at least one combination of the services of interest further comprises a bitmap indicating the at least one combination of the services of interest in a canonical sum-of-products form.

10. A method comprising:
identifying services of interest;
determining a plurality of combinations of the services of interest;
generating a pre-association request message that identifies the services of interest and the plurality of combinations of the services of interest; and
transmitting the pre-association request message.

11. The method of claim 10, wherein the plurality of combinations of the services of interest comprises two different combinations of the services of interest, each of the services of interest is included in at least one of the two different combinations of the services of interest, and at least one of the services of interest is not included in both of the two different combinations of the services of interest.

12. The method of claim 11, further comprising:
receiving, from another device, a pre-association response message responsive to the pre-association request message, the pre-association response message indicating that the another device provides the at least one combination of the services of interest;
determining, based at least in part on the pre-association request message, to authenticate and associate with the another device; and
accessing, responsive to authenticating and associating with the another device, the at least one combination of the services of interest.

13. The method of claim 12, wherein the pre-association request message comprises a probe request message and the pre-association response message comprises a probe response message.

14. The method of claim 12, wherein the pre-association request message comprises a first value that identifies a total number of the services of interest and a second value that identifies a requested number of the services of interest.

15. The method of claim 14, wherein when the second value that identifies the requested number of the services of interest is set to zero, the pre-association request message further comprises a bitmap indicating the plurality of combinations of the services of interest in a canonical sum-of-products form.

16. A computer program product comprising code stored in a non-transitory computer-readable storage medium, the code comprising:
code to determine a plurality of combinations of a plurality of available services;
code to encode the plurality of the combinations of the plurality of available services;
code to generate a pre-association message that includes the encoded plurality of combinations of the plurality of available services; and
code to transmit the pre-association message.

17. The computer program product of claim 16, wherein the plurality of combinations of the plurality of available services comprises two different combinations of the plurality of available services, each of the plurality of available services is included in at least one of the two different combinations of the plurality of available services, and at least one of the plurality of available services is not included in both of the two different combinations of the available services.

18. The computer program product of claim 16, wherein the code further comprises:
code to receive, from a device, a request to authenticate and associate responsive to the pre-association message;
code to authenticate and associate the device; and
code to provide the at least one of the plurality of combinations of the plurality of available services to the device.

19. The computer program product of claim 16, wherein the encoded plurality of combinations of the plurality of available services is represented in at least one of: a canonical sum-of-products form, a canonical product-of-sums form, or a sum-of-positive-products form.

20. The computer program product of claim 19, wherein the pre-association message further comprises a bitmap indicating the plurality of combinations of the plurality of available services in the canonical sum-of-products form.

* * * * *